United States Patent
Harsila et al.

(10) Patent No.: US 9,791,262 B2
(45) Date of Patent: Oct. 17, 2017

(54) MEASUREMENT DEVICE WITH MULTIPLEXED POSITION SIGNALS

(71) Applicant: Mitutoyo Corporation, Kanagawa-ken (JP)

(72) Inventors: Scott Allen Harsila, Shoreline, WA (US); David William Sesko, Woodinville, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 146 days.

(21) Appl. No.: 14/973,376

(22) Filed: Dec. 17, 2015

(65) Prior Publication Data

US 2017/0176171 A1 Jun. 22, 2017

(51) Int. Cl.
*G01B 11/03* (2006.01)
*G01B 11/00* (2006.01)

(52) U.S. Cl.
CPC .......... *G01B 11/007* (2013.01); *G01B 11/005* (2013.01)

(58) Field of Classification Search
CPC ............................ G01B 11/007; G01B 11/005
USPC ........................................................... 33/503
See application file for complete search history.

(56) References Cited

U.S. PATENT DOCUMENTS

| | | |
|---|---|---|
| 4,078,314 A | 3/1978 | McMurtry |
| 4,316,329 A | 2/1982 | Watson |
| 4,908,951 A | 3/1990 | Gurny |
| 4,942,671 A * | 7/1990 | Enderle ................ G01B 11/007 33/556 |
| 4,972,597 A * | 11/1990 | Kadosaki ............. G01B 11/007 33/556 |
| 5,018,280 A * | 5/1991 | Enderle ................ G01B 11/007 33/503 |
| 5,059,789 A | 10/1991 | Salcudean |
| 5,118,956 A | 6/1992 | Dunning et al. |

(Continued)

FOREIGN PATENT DOCUMENTS

| | | |
|---|---|---|
| DE | 3826581 A1 | 2/1990 |
| EP | 1 086 352 B1 | 3/2004 |

OTHER PUBLICATIONS

European Search Report Received in EP Application No. 16204096.8-1568 dated Apr. 3, 2017. 9 pages.

(Continued)

*Primary Examiner* — Christopher Fulton
(74) *Attorney, Agent, or Firm* — Seed IP Law Group LLP

(57) ABSTRACT

A scanning probe responsive in three axes is provided for use with a coordinate measuring machine. The scanning probe utilizes multiplexing techniques for producing X, Y and Z position signals. The X and Y position signals are indicative of a rotation of a stylus coupling portion about a rotation center, and the Z position signal is indicative of the position of the stylus coupling portion along the axial direction. The Z position signal is substantially insensitive to motion of the axial detection deflector in at least one direction that is transverse to the axial direction. The X, Y and Z position signals may be processed to determine a 3D position of a contact portion of the stylus, which may include utilizing the Z position signal in combination with known trigonometry of the scanning probe to remove axial motion cross coupling components from the X and Y position signals.

23 Claims, 11 Drawing Sheets

(56) References Cited

U.S. PATENT DOCUMENTS

| | | | | |
|---|---|---|---|---|
| 5,222,304 | A | * | 6/1993 | Butler .................... G01B 5/012 33/558 |
| 5,333,388 | A | * | 8/1994 | Butler .................. G01B 11/007 33/556 |
| 5,345,689 | A | * | 9/1994 | McMurtry ............. G01B 3/008 33/556 |
| 5,552,883 | A | | 9/1996 | Busch-Vishniac et al. |
| 5,659,969 | A | | 8/1997 | Butler et al. |
| 5,825,666 | A | | 10/1998 | Freifeld |
| 6,430,833 | B1 | | 8/2002 | Butter et al. |
| 6,449,861 | B1 | | 9/2002 | Danielli et al. |
| 6,772,527 | B1 | | 8/2004 | Butter et al. |
| 6,971,183 | B2 | | 12/2005 | Brenner et al. |
| 7,652,275 | B2 | | 1/2010 | Gladnick |
| 8,438,746 | B2 | | 5/2013 | Usui |
| 9,605,943 | B2 | * | 3/2017 | Shimaoka .............. G01B 5/012 |
| 9,618,312 | B2 | * | 4/2017 | Shimaoka .............. G01B 3/008 |
| 2011/0043827 | A1 | | 2/2011 | McFarland et al. |
| 2013/0050701 | A1 | | 2/2013 | Jensen et al. |
| 2013/0125044 | A1 | | 5/2013 | Saylor et al. |
| 2016/0258744 | A1 | * | 9/2016 | Shimaoka .............. G01B 11/14 |
| 2017/0146336 | A1 | * | 5/2017 | Shimaoka ............ G01B 11/007 |
| 2017/0176170 | A1 | * | 6/2017 | Sesko .................. G01B 11/005 |

OTHER PUBLICATIONS

European Search Report Received in EP Application No. 16204033. 1-1568 dated May 10, 2017. 17 pages.

MacLachlan et al., "High-Speed Microscale Optical Tracking Using Digital Frequency-Domain Multiplexing," IEEE, vol. 58(6), Jun. 6, 2009, 11 pages.

\* cited by examiner

MEASUREMENT DEVICE WITH MULTIPLEXED POSITION SIGNALS

BACKGROUND

Technical Field

This disclosure relates to precision metrology, and more particularly to sensing configurations in probes used with coordinate measuring machines.

Description of the Related Art

Coordinate measurement machines (CMMs) can obtain measurements of inspected workpieces. One exemplary prior art CMM that is described in U.S. Pat. No. 8,438,746, which is hereby incorporated herein by reference in its entirety, includes a probe for measuring a workpiece, a movement mechanism for moving the probe, and a controller for controlling the movement. A CMM including a surface scanning probe is described in U.S. Pat. No. 7,652,275, which is hereby incorporated herein by reference in its entirety. As disclosed therein, a mechanical contact probe or an optical probe may scan across the workpiece surface.

A CMM employing a mechanical contact probe is also described in U.S. Pat. No. 6,971,183 (the '183 patent), which is hereby incorporated herein by reference in its entirety. The probe disclosed therein includes a stylus having a surface contact portion, an axial motion mechanism and a rotary motion mechanism. The axial motion mechanism includes a moving member that allows the contact portion to move in a central axis direction (also referred to as a Z direction or an axial direction) of the measuring probe. The rotary motion mechanism includes a rotating member that allows the contact portion to move perpendicular to the Z direction. The axial motion mechanism is nested inside the rotary motion mechanism. The contact portion location and/or workpiece surface coordinates are determined based on the displacement of the rotating member and the axial displacement of the axial motion moving member.

Motion mechanisms and/or conventional displacement detector arrangements such as those disclosed in the '183 patent may be relatively expensive and/or susceptible to various "cross coupling" errors due to mechanism and/or detector imperfections. A need exists for a relatively compact sensing configuration in a probe wherein the displacement detector arrangements may be relatively less expensive while also rejecting various "cross coupling" errors despite reasonably expected mechanism and/or detector imperfections.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A scanning probe responsive in three axes is provided for use in a measuring machine (e.g., a CMM). The scanning probe includes a stylus suspension portion and a stylus position detection portion. The stylus suspension portion includes a stylus coupling portion that is configured to be rigidly coupled to a stylus, and a stylus motion mechanism that is configured to enable axial motion of the stylus coupling portion along an axial direction, and rotary motion of the stylus coupling portion about a rotation center. The stylus position detection portion includes a light source configuration, a multiple-spot position detector portion, multiplexing signal processing and control circuitry, a rotary position detection configuration, and an axial position detection configuration. In various implementations, the light source configuration includes a controllable rotary detection light source that is configured to provide a rotary detection beam and a controllable axial detection light source that is configured to provide an axial detection beam.

In various implementations, the rotary position detection configuration includes a rotary detection beam path and a rotary detection deflector. The rotary detection beam path is configured to receive the rotary detection beam from the rotary detection light source. The rotary detection deflector is located along the rotary detection beam path and is coupled to the stylus suspension portion and is configured to output a variable-deflection rotary detection light beam to the multiple-spot position detector portion.

In various implementations, the axial position detection configuration includes an axial detection beam path and an axial detection deflector. The axial detection beam path is configured to receive the axial detection beam from the axial detection light source. The axial detection deflector is located along the axial detection beam path and is coupled to the stylus suspension portion and is configured to output a variable-deflection axial detection light beam to the multiple-spot position detector portion. The axial detection deflector is configured to move in the axial direction in response to the axial motion, and is also configured to move in at least one direction transverse to the axial direction in response to the rotary motion.

In various implementations, the multiple-spot position detector portion is configured to receive the variable-deflection rotary detection light beam and in response thereto to output X and Y position signals indicative of the rotation of the stylus coupling portion about the rotation center. The multiple-spot position detector portion is also configured to receive the variable-deflection axial detection light beam and in response thereto to output a Z position signal indicative of the position of the stylus coupling portion about the axial direction.

In various implementations, the multiplexing signal processing and control circuitry is configured to multiplex the variable-deflection rotary detection light beam and the variable-deflection axial detection light beam onto the multiple-spot position detector portion, and to provide demultiplexing to separate the X and Y position signals from the Z position signal. In various implementations, the stylus position detection portion is configured such that the Z position signal is substantially insensitive to motion of the axial detection deflector in the at least one direction that is transverse to the axial direction.

DETAILED DESCRIPTION

Figure 1:
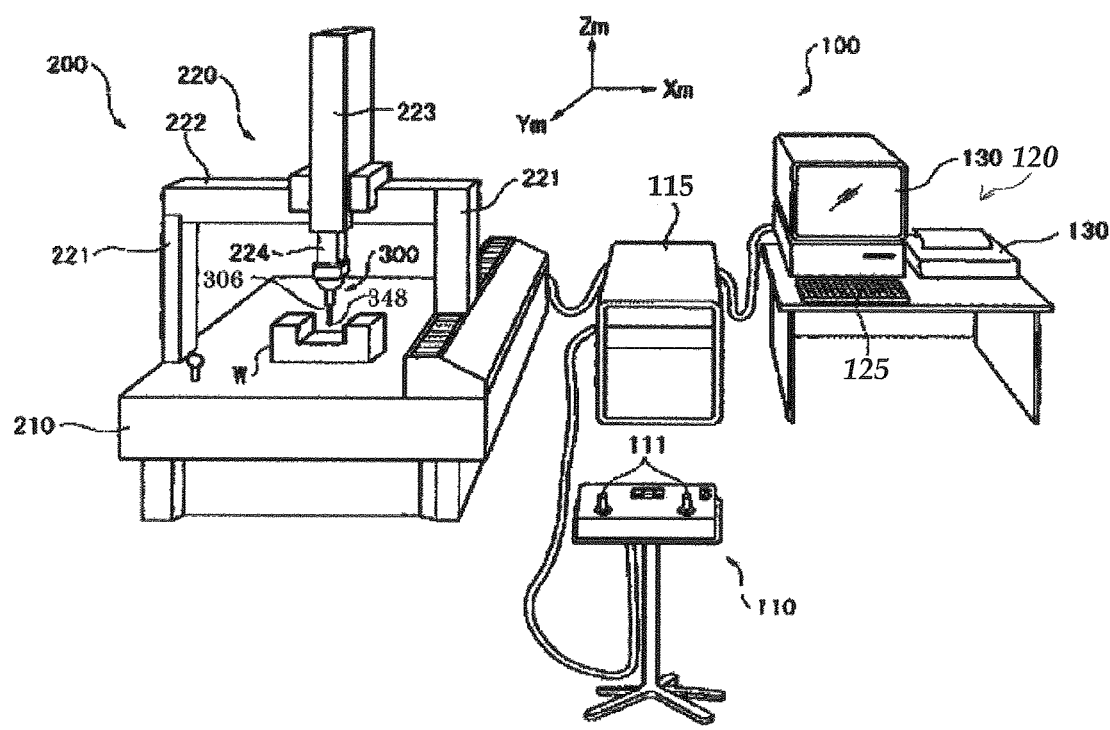
FIG. 1 is a diagram showing various typical components of a measuring system including a CMM utilizing a scanning probe such as that disclosed herein.

FIG. 1 is a diagram showing various typical components of a measuring system 100 including a CMM 200 utilizing a scanning probe 300 such as that disclosed herein. The measuring system 100 includes an operating unit 110, a motion controller 115 that controls movements of the CMM 200, a host computer 120 and the CMM 200. The operating unit 110 is coupled to the motion controller 115 and may include joysticks 111 for manually operating the CMM 200. The host computer 120 is coupled to the motion controller 115 and operates the CMM 200 and processes measurement data for a workpiece W. The host computer 120 includes input means 125 (e.g., a keyboard, etc.) for inputting, for example, measurement conditions, and output means 130 (e.g., a display, printer, etc.) for outputting, for example, measurement results.

The CMM 200 includes a drive mechanism 220 which is located on a surface plate 210, and an attachment portion 224 for attaching the scanning probe 300 to the drive mechanism 220. The drive mechanism 220 includes X axis, Y axis, and Z axis slide mechanisms 222, 221, and 223, respectively, for moving the scanning probe 300 three-dimensionally. A stylus 306 attached to the end of the scanning probe 300 includes a contact portion 348. As will be described in more detail below, the stylus 306 is attached to a stylus suspension portion of the scanning probe 300, which allows the contact portion 348 to freely change its position in three directions when the contact portion 348 moves along a measurement path on the surface of the workpiece W.

Figure 2:
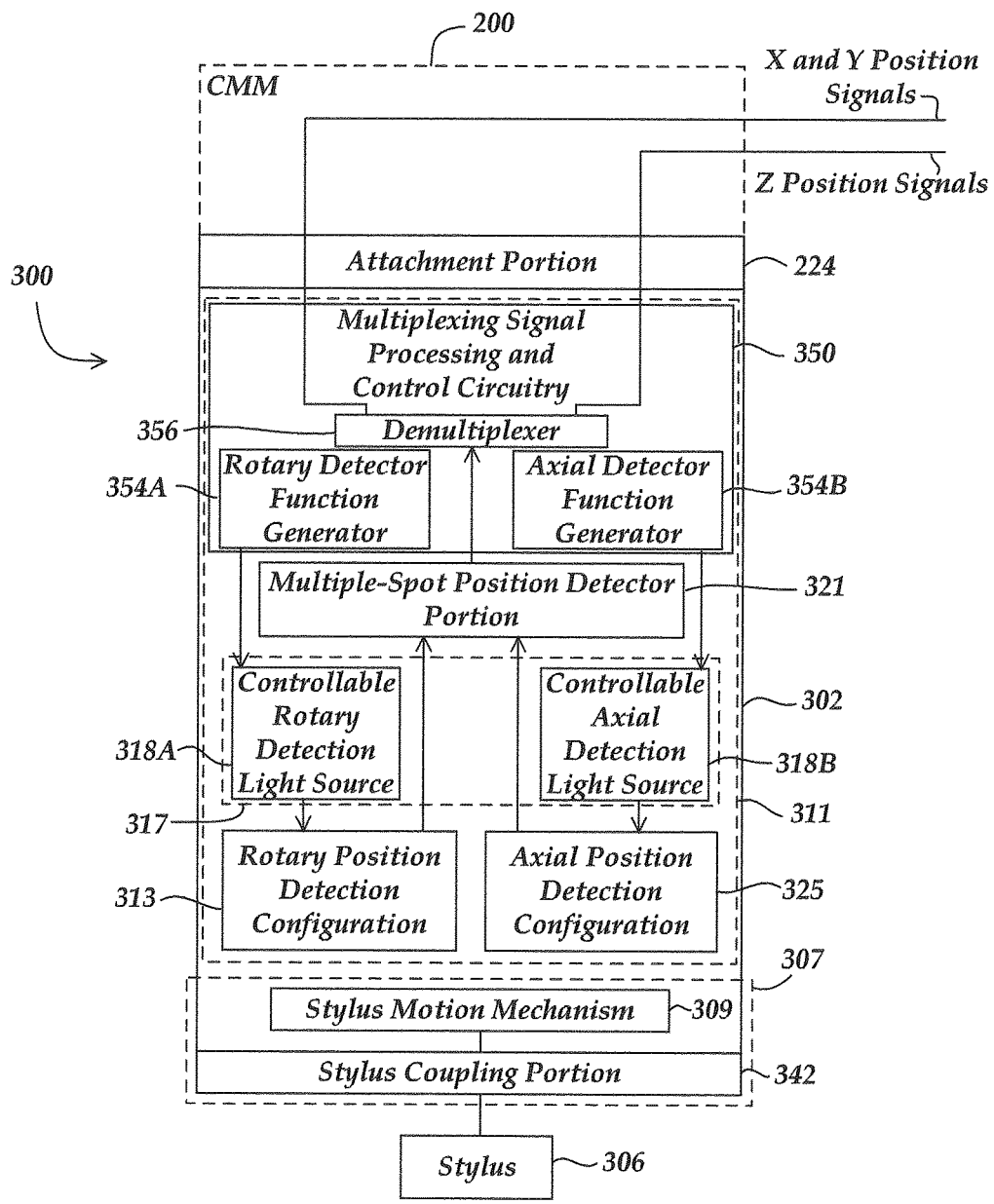
FIG. 2 is a block diagram showing various elements of a scanning probe as coupled to a CMM and providing X, Y and Z position signals.

FIG. 2 is a block diagram showing various elements of a scanning probe 300 as coupled to a CMM 200 and providing X, Y and Z position signals. The scanning probe 300 includes a probe main body 302 which incorporates a stylus suspension portion 307 and a stylus position detection portion 311. The stylus suspension portion 307 includes a stylus coupling portion 342 and a stylus motion mechanism 309. The stylus coupling portion 342 is rigidly coupled to a stylus 306. The stylus motion mechanism 309 is configured to enable axial motion of the stylus coupling portion 342 and attached stylus 306 along an axial direction, and to enable rotary motion of the stylus coupling portion 342 and attached stylus 306 about a rotation center, as will be described in more detail below with respect to FIGS. 3 and 4.

As shown in FIG. 2, the stylus position detection portion 311 includes a light source configuration 317, a multiple-spot position detector portion 321, multiplexing signal processing and control circuitry 350, a rotary position detection configuration 313, and an axial position detection configuration 325. The light source configuration 317 includes a controllable rotary detection light source 318A and a controllable axial detection light source 318B. The multiplexing signal processing and control circuitry 350 includes a rotary detection function generator 354A, an axial detection function generator 354B, and a demultiplexer 356.

The rotary position detection configuration 313 receives a rotary detection light beam from the controllable rotary detection light source 318A and outputs a variable-deflection rotary detection light beam to the multiple-spot position detector portion 321. The axial position detection configuration 325 receives an axial detection light beam from the controllable rotary detection light source 318B and outputs a variable-deflection axial detection light beam to the multiple-spot position detector portion 321. The rotary detection function generator 354A and the axial detection function generator 354B control the controllable rotary detection light source 318A and the controllable axial detection light source 318B, respectively, so as to multiplex the variable-deflection rotary detection light beam and the variable-deflection axial detection light beam onto the multiple-spot position detector portion 321.

The multiple-spot position detector portion 321 receives the variable-deflection rotary detection light beam and in response thereto outputs X and Y position signals indicative of a rotation of the stylus coupling portion 342 about a rotation center, and also receives the variable-deflection axial detection light beam and in response thereto outputs a Z position signal indicative of the position of the stylus coupling portion 342 about an axial direction. The demultiplexer 356 receives the multiplexed X, Y and Z position signals from the multiple-spot position detector portion 321 and performs demultiplexing operations to separate the X and Y position signals from the Z position signal. In various implementations, one or more receiving portions (e.g., in the CMM 200, motion controller 115, host computer 120, etc.) may receive the X, Y and Z position signals from the demultiplexer 356 and one or more associated processing portions may be utilized to determine a 3D position of the stylus coupling portion 342 and/or of the contact portion of the attached stylus 306 as the contact portion moves along a surface of a workpiece W that is being measured. As will be described in more detail below, in various implementations the processing of the X, Y and Z position signals may include utilizing the Z position signal in combination with the known trigonometry of the scanning probe to remove axial motion cross coupling components from the X and Y position signals. In various implementations, certain portions of the scanning probe 300 (e.g., portions of the demultiplexer 356 and/or rotary detection function generator 354A and axial detection function generator 354B) may be included outside of the probe main body 302 (e.g., as included in the CMM 200, motion controller 115, host computer 120, etc.).

It will appreciated that the utilization of the single multiple-spot position detector portion 321 (e.g., corresponding to a single position photodetector as opposed to an implementation utilizing multiple position photodetectors) has various advantages. For example, a resulting configuration may be made more compact (e.g., allowing for a smaller path length of the XY optical beam, making the overall z-height of the probe smaller, etc.) and less expensive (reduced photodetector costs, etc.) In various implementations, the multiplexing signal processing and control circuitry 350 that is required for such configurations may utilize different types of multiplexing techniques (e.g., frequency domain multiplexing, time domain multiplexing, etc.) Examples of measurement techniques utilizing multiplexing in a configuration with multiple light beams received by a position sensitive detector are described in U.S. Pat. No. 5,552,883, and in the article "High-Speed Microscale Optical Tracking Using Digital Frequency-Domain Multiplexing" (MacLachlan, R. A., Riviere, C. N., *IEEE Transactions On Instrumentation and Measurement*, Vol. 58, No. 6, June 2009, pp. 1991-2001), each of which is hereby incorporated herein by reference in its entirety.

In an implementation utilizing frequency domain multiplexing, the rotary detection function generator 354A and the axial detector function generator 354B may be utilized for driving the controllable rotary detection light source 318A and the controllable axial detection light source 318B (e.g., including LEDs), respectively, with different frequencies. As a result, the variable-deflection rotary detection light beam and the variable-deflection axial detection light beam that are incident on the multiple-spot position detector portion 321 (e.g., including a position photodetector) may have two different frequencies. Correspondingly, the output from the multiple-spot position detector portion 321 may be encoded with the AC frequency modulation at the two different frequencies. In order to demultiplex the signals, the demultiplexer 356 may include components such as bandpass filters (e.g., corresponding to the two different frequencies), hardware and/or software demodulators, etc.

In operation, when the incident light on the multiple-spot position detector portion 321 (e.g., corresponding to at least one of a rotary detection spot or an axial detection spot) changes position, the output AC amplitude changes. In various implementations, the utilization of the frequency domain multiplexing may help reduce 1/F drift. In certain implementations, approximately 25% to 50% of the dynamic range may be allocated to the minimum AC modulation depth. In certain implementations, it may be desirable that a first driving frequency (e.g., from the rotary detector function generator 354A) should be larger by a designated amount (e.g., at least 10× larger in one specific example implementation) than the desired sensor bandwidth, so that the modulation carrier frequency will be less likely to corrupt a desired sensor position signal. In such an implementation, the frequency for a second driving frequency (e.g., corresponding to the axial detector function generator 354B) may be simulated in order to determine a sufficient separation depending on the desired sensor bandwidth and the number of filter poles. More specifically, the first and second driving frequencies may be made to be sufficiently separated so that they can be distinguished through bandpass filtering. In general, values may be set such that the desired second driving frequency is greater than the first driving frequency by at least a specified margin (e.g., with a margin equal to at least 4× the sensor bandwidth, in one specific example implementation).

In an implementation utilizing time domain multiplexing, the controllable rotary detection light source 318A may be turned on during a first time period, for which the corresponding output from the multiple-spot position detector portion 321 may be read, followed by a second time period during which the controllable axial detection light source 318B may be turned on and the corresponding output from the multiple-spot position detector portion 321 may be read. In certain implementations, such time domain multiplexing techniques may be considered to be more simple than the above described techniques utilizing frequency domain multiplexing. However, in such implementations the output signals corresponding to the rotary position detection configuration 313 and axial position detection configuration 325 may not be read out simultaneously, for which it may be desirable for the time domain multiplexing cycle rate to be made fast enough that the time lag between samples does not create an undesired measurement result. In one specific example implementation, an approximately 2.5 kHz position throughput is implemented, and a corresponding cycle rate that is greater by a specified amount (e.g., 4×, 10×, etc.) is utilized. In various implementations, an oversampling technique may be utilized for which an averaging of readings may be implemented.

Figure 3:
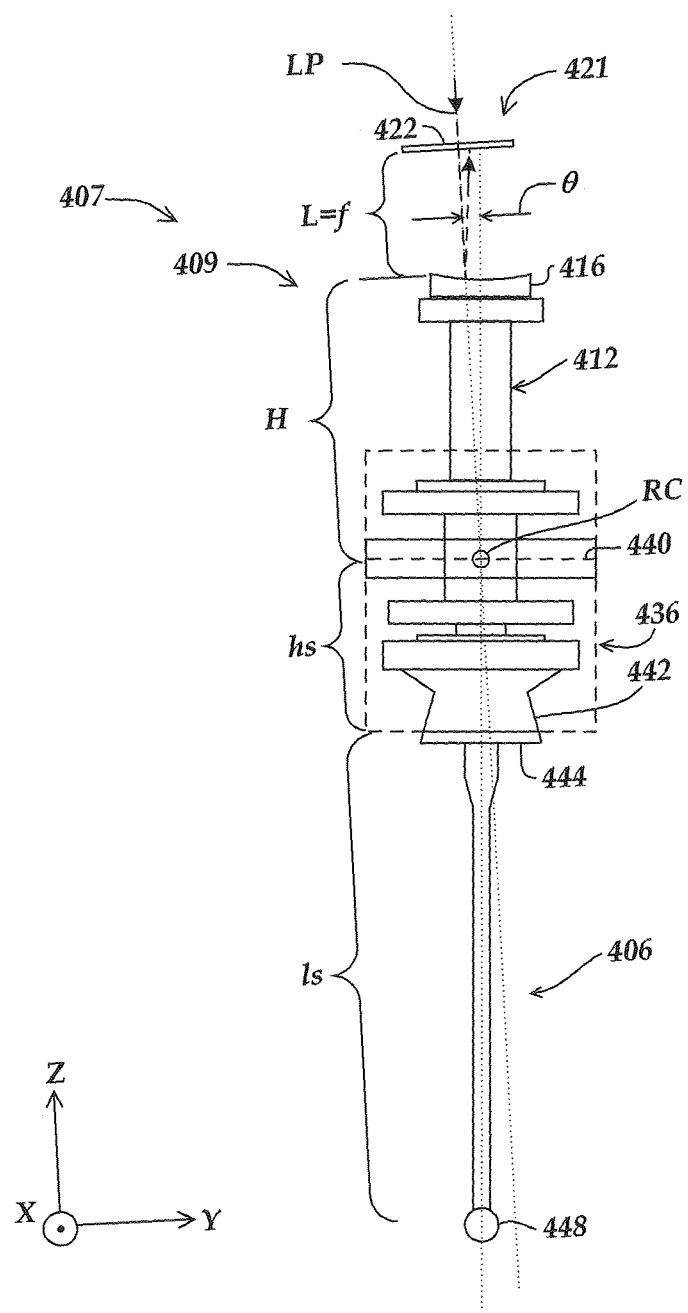
FIG. 3 is a diagram showing portions of a first exemplary implementation of a stylus suspension portion as coupled to a stylus.

FIG. 3 is a diagram showing portions of a first exemplary implementation of a schematically/partially represented stylus suspension portion 407 as coupled to a stylus 406. It will be appreciated that certain numbered components 4XX of FIG. 3 may correspond to and/or have similar operations as similarly numbered counterpart components 3XX of FIG. 2, and may be understood by analogy thereto and as otherwise described below. This numbering scheme to indicate elements having analogous design and/or function is also applied to the following FIGS. 4-11. As shown in FIG. 3, the stylus suspension portion 407 includes a stylus motion mechanism 409 and a stylus coupling portion 442. The stylus coupling portion 442 is configured to be rigidly coupled to a stylus 406 which has a contact portion 448 for contacting a surface S of a workpiece W (not shown).

As described in more detail below with respect to FIG. 4, the stylus motion mechanism 409 is configured to enable axial and rotary motion of the stylus coupling portion 442 and attached stylus 406 so that the contact portion 448 can change its position in three directions along the shape of the surface S. For purposes of illustration, the vertical and horizontal directions on the plane of paper in FIG. 3 are defined as Z and Y directions, respectively, and the perpendicular direction to the plane of the paper is defined as the X direction. The direction of a central axis O (axial direction O) of the measuring probe 300 coincides with the Z direction in this illustration.

In FIG. 3, rotary motion portions of the stylus motion mechanism 409 are illustrated, including a rotating member 436 (which is also referenced as a rotating member RP), a flexure element 440, and a moving member 412 disposed within the rotating member 436. As described in more detail below with respect to FIG. 4, the flexure element 440 enables rotary motion of the rotating member 436 about a rotation center RC. As described in more detail below with respect to FIG. 5, a stylus position detection portion (not shown in entirety) may include a rotary detection deflector 416 (e.g., a concave mirror) attached to an end of the moving member 412, which reflects light toward a multiple-spot position detector portion 421 which includes a position photodetector 422. The position photodetector 422 is thus able to sense the rotated position of the moving member 412 in X and Y directions. The concave surface of the rotary detection deflector 416 may be shaped to provide a desired "deflection relationship" for the reflected light detected by the position photodetector 422. Such a configuration may have various advantages (e.g., allowing for a miniaturization of the position photodetector 422, allowing for a larger range of styluses with different lengths to be utilized, etc.). The following approximations may be utilized for understanding various aspects of the system (e.g., tilt sensitivity, etc.)

With respect to the example configuration illustrated in FIG. 3, in one example implementation the concave surface of the rotary detection deflector 416 may have a radius R, and the light beam input to the rotary detection deflector may be collimated along the direction of its undeflected optical axis (e.g., as indicated by the dashed light path line LP in FIG. 3). The position photodetector 422 may be located at an optical path length L=R/2 from the rotary detection deflector 416, which is approximately equal to the resulting focal distance of the reflected light beam (i.e., the variable-deflection rotary detection light beam) from the rotary detection deflector 416. In such an implementation, the movement or displacement $\Delta X_{PSD}$ along the X direction away from null for the rotary detection spot on the position photodetector 422 (e.g., formed by the variable-deflection rotary detection light beam from the rotary detection deflector 416) may include two contributions due to rotary motion tilt $\theta_Y$ of the rotating member 436 in a plane parallel to the X direction (that is, rotation about an axis parallel to the Y axis at the rotation center RC), which may be approximated as:

tilt contribution=$(L*\theta_Y)$ (Eq. 1)

translation contribution=$(L*\theta_Y*H/R)=(L*\theta_Y*H/2L)$ (Eq. 2)

where H is the distance from the rotation center RC to the rotary detection deflector 416.

The tilt contribution is from the surface tilt change of the deflector 416 due to rotation, and the translation contribution is from a curvature-dependent surface angle change on the deflector as a function of distance away from the optical axis of the deflector 416. Thus, combining the contributions shown in Equations 1 and 2:

$\Delta X_{PSD}=L\theta_Y(1+H/2L)$ (Eq. 3)

The X direction movement or displacement $\Delta X_{STYLUS}$ away from null of the contact portion 448 of the stylus 406 in relation to the rotary motion tilt component $\theta_Y$ may be approximated as:

$\Delta X_{STYLUS}=\theta_Y*(h_S+I_S)$ (Eq. 4)

Combining Equations 3 and 4, the ratio of the X direction spot displacement on the position photodetector 422 in relation to the X direction displacement at the contact portion 448 may be approximated as:

$\Delta X_{PSD}/\Delta X_{STYLUS}=(L+(H/2))/(h_S+I_S)$ (Eq. 5)

Y coordinate motion components are analogous to the above expressions, and need not be explained in further detail herein. The stylus length $I_S$ for various styli may be utilized in the equations (e.g., with respect to the trigonometry of the system) for determining the XY position of the contact portion 448 based on the XY detected spot position.

Figure 4:
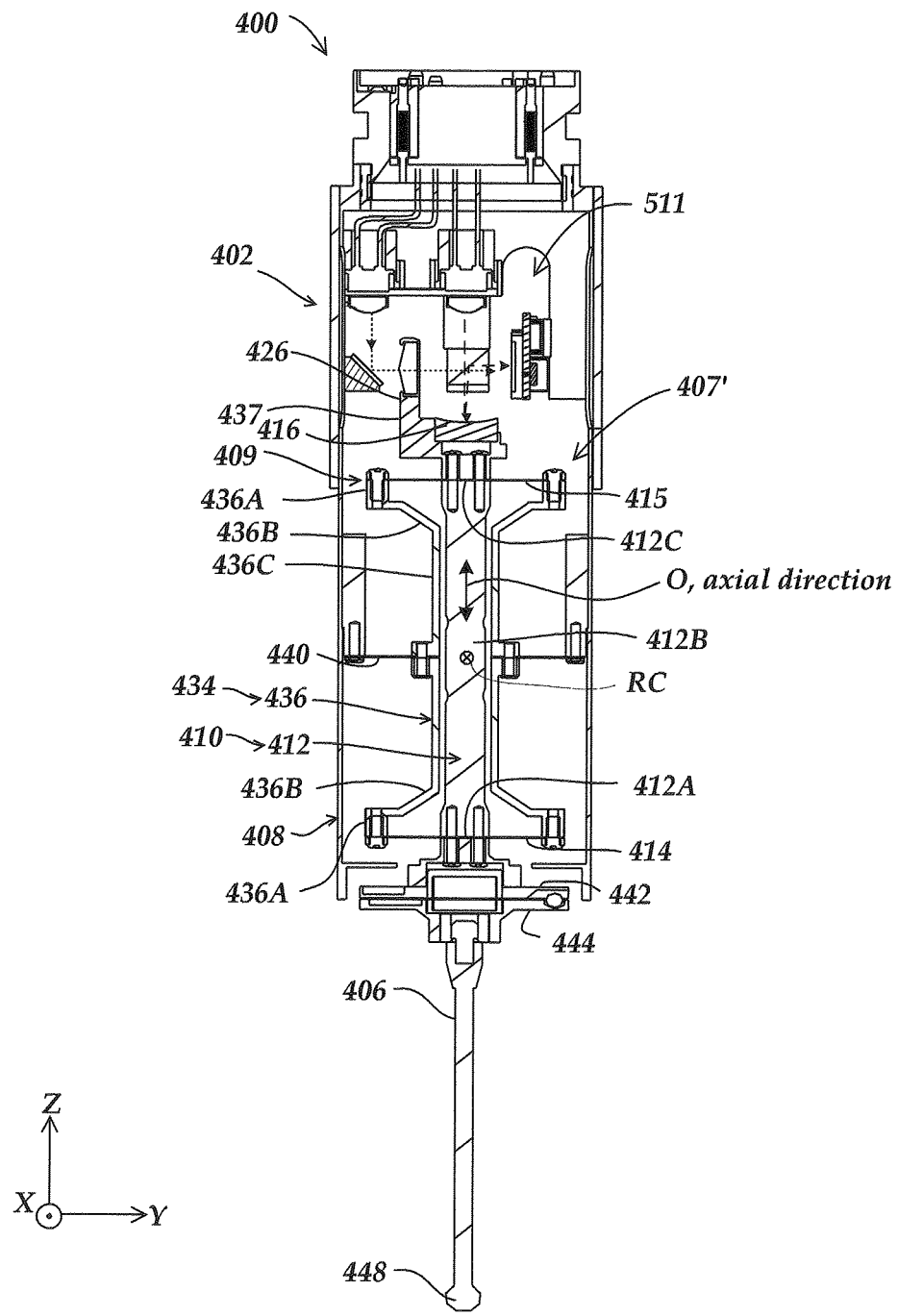
FIG. 4 is a diagram showing a cross section of one implementation of the stylus suspension portion of FIG. 3 as included within a main body housing of a scanning probe.

FIG. 4 is a partially schematic diagram showing one implementation of a cross section of a stylus suspension portion 407' usable as the stylus suspension portion 407 represented in FIG. 3, as included within a main body housing 408 of a probe main body 402 of a scanning probe 400. As shown in FIG. 4, the stylus suspension portion 407' includes a stylus motion mechanism 409 and a stylus coupling portion 442 which is coupled to a stylus 406. The stylus motion mechanism 409 may include a moving member 412, a rotating member 436, a flexure element 440 coupled to the main body housing 408 for supporting and enabling rotary motion of the rotating member 436, and flexure elements 414 and 415 supporting the moving member 412 and coupling it to the rotating member 436 for enabling axial motion of the moving member 412. The scanning probe 400 includes a stylus position detection portion 511 having components and operation described in greater detail below with reference to FIG. 5, for determining the position and/or motion of the stylus motion mechanism 409 and/or the contact portion 448 of the stylus 406.

The flexure element 440 (i.e., referenced as a second flexure element) may be disposed between the respective planes of a pair of flexure elements 414 and 415 (i.e., referenced as first flexure elements) in the axial direction O. Examples of flexure elements 414, 415 and 440 will be described in more detail below with respect to FIGS. 10A and 10B. The rotating member 436 may have a shape symmetric about the second flexure element 440 and may integrally include: two ring portions 436A; two connecting portions 436B; and a cylindrical portion 436C. Peripheral portions of the first flexure elements 414 and 415 are fixed to the ring portions 436A. The connecting portions 436B extend inside of the ring portions 436A so as to connect to the cylindrical portion 436C, which has a hollow center. The first flexure elements 414 and 415 may be disposed at a symmetric distance with respect to the second flexure element 440, although such an implementation is exemplary only and not limiting.

An axial motion mechanism 410 including the moving member 412 is supported inside of the rotating member 436, and the rotating member 436 and the axial motion mechanism 410 together constitute a motion module that is part of the stylus motion mechanism 409. The axial motion mechanism 410 allows the contact portion 448 to move in the axial direction O. The rotary motion mechanism 434 including the rotating member 436 allows the contact portion 448 of the stylus 406 to move transverse (e.g., approximately perpendicular) to the axial direction O by means of rotary motion about the rotation center RC.

The moving member 412 integrally includes: a lower portion 412A; a rod portion 412B; and an upper portion 412C. A bracket 437 is utilized for rigidly attaching the rotary detection deflector 416 (e.g., a curved mirror) and an axial detection deflector 426 (e.g., a lens) to the upper portion 412C. As previously outlined and as described in further detail below with respect to the stylus position detection portion 511 shown in FIG. 5, the rotary detection deflector 416 is included as part of a rotary position detection configuration, and the axial detection deflector 426 is included as part of an axial position detection configuration. The rod portion 412B is disposed between the pair of first flexure elements 414 and 415. The rod portion 412B is housed in the rotating member 436.

The lower portion 412A is formed below the rod portion 412B and a stylus coupling portion 442 (e.g., a flange member) is attached to the lower portion 412A. A flange part 444 is provided for attachment of the stylus 406. The flange part 444 and the stylus coupling portion 442 together may constitute a detachable coupling mechanism (e.g., a known type of kinematic joint or coupling) which allows attachment and detachment between various styli 406 and the stylus coupling portion 442 with repeatable positioning (e.g., in the case of a collision knocking off a stylus, when intentionally changing styli, etc.).

Figure 5:
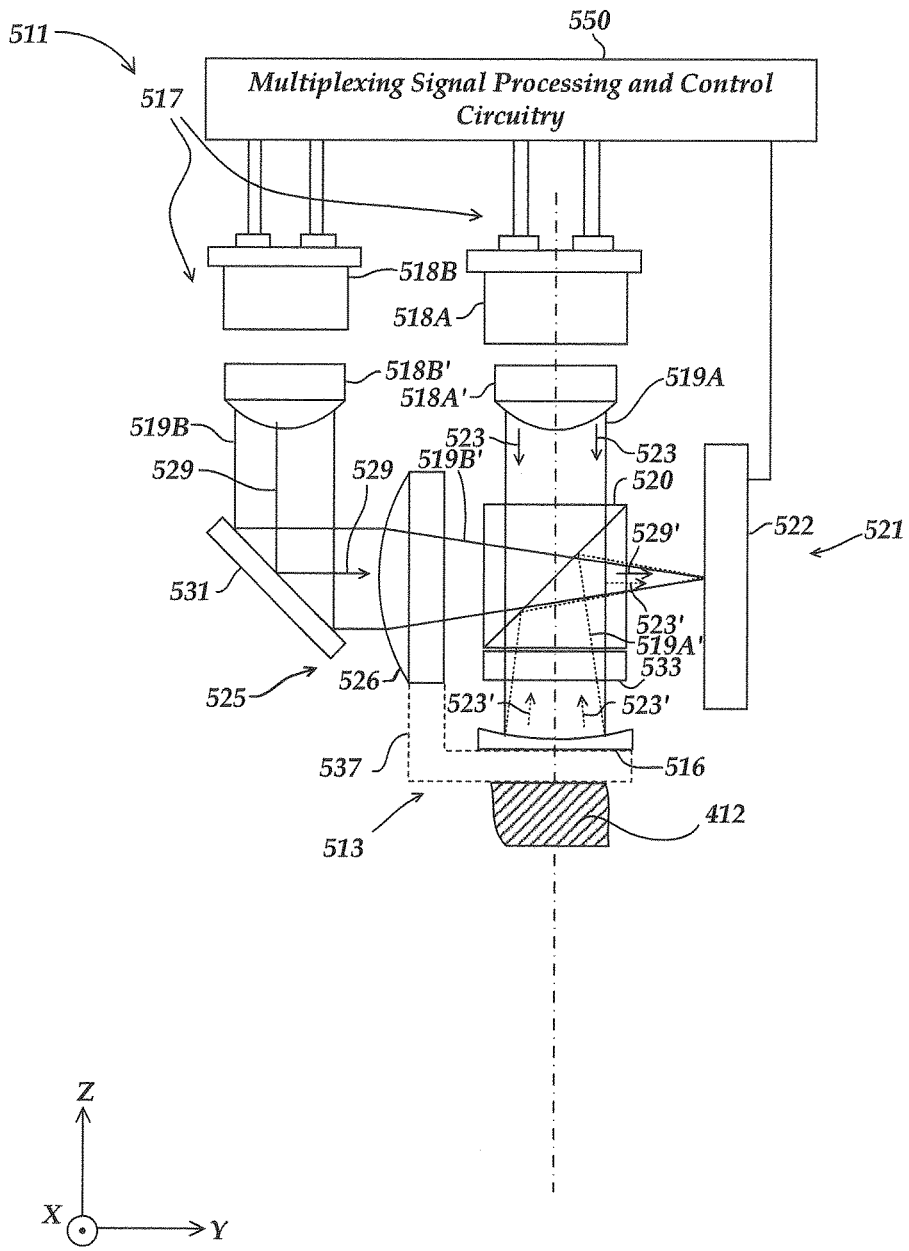
FIG. 5 is a diagram showing a first exemplary implementation of a stylus position detection portion for coupling to a stylus suspension portion.

FIG. 5 is a diagram showing a first exemplary implementation of a stylus position detection portion 511 which includes a rotary detection deflector 516 and an axial detection deflector 526 that move relative to the probe body and housing. Various other components of the stylus position detection portion 511 may be fixed relative to the probe body and/or housing unless otherwise indicated. As shown in FIG. 5, the stylus position detection portion 511 includes a light source configuration 517, a multiple-spot position detector portion 521, multiplexing signal processing and control circuitry 550, a rotary position detection configuration 513, and an axial position detection configuration 525. As will be described in more detail below, the multiple-spot position detector portion 521 is coupled to the multiplexing signal processing and control circuitry 550 and includes a position photodetector 522 having a surface plane. As illustrated in FIG. 5, the light source configuration 517 includes a controllable rotary detection light source 518A and a controllable axial detection light source 518B (e.g., LED light sources), which may be configured to provide a collimated or nearly collimated rotary detection light beam 519A and an axial detection light beam 519B, respectively (e.g., using collimating lenses 518A' and 518B'). The rotary detection light beam 519A is directed along a rotary detection beam path 523 that is included in the rotary position detection configuration 513, and the axial detection light beam 519B is directed along an axial detection beam path 529 that is included in the axial position detection configuration 525.

The rotary position detection configuration 513 includes the rotary detection beam path 523 and the rotary detection deflector 516. In the illustrated implementation, the rotary detection light beam 519A is transmitted through an optical component 520 (e.g., a polarizing beamsplitter) and travels along the rotary detection beam path 523 along the axial direction to the rotary detection deflector 516 where it is reflected. The operation of the rotary detection deflector 516 may be generally understood by analogy with the previous description of the rotary detection deflector 416, the position photodetector 422, and Equations 1-5. As illustrated, the rotary detection light beam 519A is reflected by the concave rotary detection deflector 516 as a variable-deflection rotary detection light beam 519A' which travels along a variable-deflection beam path 523' back toward a reflecting surface of the optical component 520. The reflecting surface of the optical component reflects at least part of the variable-deflection rotary detection light beam 519A' to continue along the variable-deflection beam path 523' along a direction transverse to the optical axis to form a rotary detection spot at a position on the surface of the position photodetector 522. The position photodetector 522 may be of a known type that provides signals that are related to the rotary detection spot position along an X axis direction and a Y axis direction, respectively. In various implementations, such signals may be designated as X and Y position signals that are indicative of the rotation of the stylus coupling portion about the rotation center. More specifically, the position photodetector 522 is configured to output the X position signal responsive to the position of the rotary detection spot along a first axis of the position photodetector 522, and to output the Y position signal responsive to the position of the rotary detection spot along a second axis of the position photodetector 522. In various implementations, the rotary position detection configuration 513 is nominally configured such that when there is no rotation of the stylus coupling portion about the rotation center, the X and Y position signals are substantially insensitive to motion of the rotary detection deflector 516 along the axial direction.

In relation to the optical component 520, a quarter waveplate 533 may be located along a portion of the rotary detection beam path between the optical component 520 and the rotary detection deflector 516. The quarter waveplate 533 changes the linear polarization from the optical component 520 to circular polarization according to known methods. The variable-deflection rotary detection light beam 519A' reflected from the rotary detection deflector 516 passes back though the quarter waveplate 533 and becomes linearly polarized again, with a rotated polarization such that the optical component 520 will reflect all or most of the light toward the position photodetector 522. Such a polarizing configuration may isolate the light source 518A from reflected light, and significantly improve the stylus position detection power efficiency compared to a nonpolarizing configuration.

The axial position detection configuration 525 includes the axial detection beam path 529 and the axial detection deflector 526. In the illustrated implementation, the axial detection light beam 519B travels along the axial detection beam path 529 and is reflected by a reflecting component 531 (e.g., a mirror) to travel toward the axial detection deflector 526. The axial detection deflector 526 is located with its optical axis extending along a portion of the axial detection beam path 529 that is oriented transverse to the axial direction, and directs a transmitted variable-deflection axial detection light beam 519B' along a variable-deflection beam path 529' to form an axial detection spot at a position on the surface plane of the position photodetector 522. The position photodetector 522 may be of a known type that provides a signal that is related to the position of the axial detection spot along a Z detection axis. In various implementations, the Z detection axis may correspond to either the first or second axis of the position photodetector that was referenced above with respect to the rotary position detection configuration 513. It will be appreciated that, in accordance with the above description, the position photodetector 522 receives on its surface both an axial detection spot from the axial position detection configuration 525 and a rotary detection spot from the rotary position detection configuration 513. As described above with respect to FIG. 2, the multiplexing signal processing and control circuitry 550 is utilized to distinguish the signals resulting from the spots for determining the respective X, Y and Z position signals.

The axial detection deflector 526 is coupled to the moving member of a stylus suspension portion (e.g., the moving member 412 previously described with reference to FIG. 4). In one implementation, the axial detection deflector 526 and the rotary detection deflector 516 are both attached to a bracket 537, which is coupled to the moving member 412. Axial motion of the moving member moves the axial detection deflector 526 along the axial direction transverse to its optical axis and transverse to the axial detection beam path 529 (e.g., approximately along the Z axis direction). This translation repositions the axial detection deflector 526 relative to the input axial detection beam path 529. The lens shape of the axial detection deflector 526 causes a refraction or deflection of the transmitted variable-deflection axial detection light beam 519B' and the corresponding variable-deflection beam path 529' as a function of distance away from the optical axis of the axial detection deflector 526. Thus, the position of the resulting axial detection spot on the position photodetector 522 is indicative of the axial motion of the axial detection deflector 526 and the moving member that it is attached to.

With respect to the configuration illustrated in FIG. 5, the axial detection light beam 519B that is input to the axial detection deflector 526 may be collimated along the direction of its undeflected optical axis. The position photodetector 522 may be located at an optical path length which is approximately equal to the focal distance of the variable-deflection axial detection light beam 519B' that is output from the axial detection deflector 526. In such an implementation, the ratio of the Z direction spot displacement $\Delta Z_{PSD}$ (e.g., corresponding to the displacement of the axial detection spot along a Z detection axis of the position photodetector 522) in relation to the Z direction displacement $\Delta Z_{STYLUS}$ at a stylus contact portion (e.g., the contact portion 448 shown FIG. 3) may be approximated as:

$$\Delta Z_{PSD}/\Delta Z_{STYLUS} \approx 1 \qquad \text{(Eq. 6)}$$

In various implementations, mechanical complexity is avoided if the axial detection deflector 526 is able to move in at least one direction that is transverse to the axial direction. For example, as illustrated in FIG. 5, both the axial detection deflector 526 and the rotary detection deflector 516 are able to move in 3 directions. However, according to the principles disclosed herein, motion of the axial detection deflector 526 approximately along the direction of its optical axis, transverse to the axial direction (i.e., approximately along the Y axis), may alter the degree of focus of the resulting axial detection spot or line without substantially altering the effective position of the axial detection spot or line on the position photodetector 522. The resulting Z position signal is thus substantially insensitive to such a defocusing motion. In addition, an expected range of motion of the axial detection deflector 526 approximately along the X axis direction as produced by small $\theta_Y$ rotations of the stylus may alter the effective position of a Z position spot (not a line) on the position photodetector 522 along the "unsensed" X axis direction without substantially altering its Z position, making the Z position signal substantially insensitive to such X axis motion. However, it is worth noting that when the axial detection deflector 526 is a relatively simple circular lens (e.g., as illustrated in FIG. 5), the motion arc of the axial detection deflector produced by a large $\theta_Y$ rotation of the stylus may produce an arc motion of the Z position spot on the position photodetector 522 that includes a small Z position change component, in addition to an undesirable and/or unsensed X axis position change component of the spot. Calibration or compensation may be used to reduce or eliminate related residual Z error effects in signal processing. Alternatively, a more complicated axial detection deflector comprising at least one of two crossed cylindrical lenses may be used to optically reduce the undesirable and/or unsensed X axis position change component of the spot, and further reduce and/or simplify the correction of any minor undesirable Z axis position change component of the Z position spot on the position photodetector 522 due to the motion arc, as outlined in greater detail below.

As noted above, motion of the rotary detection deflector 516 along its optical axis (that is, approximately along the axial direction and/or Z axis direction) may alter the resulting degree of focus of the axial detection spot on the position photodetector 522, which as described above may be relatively inconsequential to the resulting Z position signal. In various implementations, there may also be some relatively undesirable cross coupling between axial motion and the X and Y position signals. For example, Equations 3 and 5 show that the X direction spot displacement $\Delta X_{PSD}$ (e.g., corresponding to the displacement of the rotary detection spot along an X axis of the position photodetector 522) is sensitive to the optical path length L between the rotary detection deflector 516 and the position photodetector 522. A similar effect is noted for the Y direction spot displacement $\Delta Y_{PSD}$ (e.g., corresponding to the displacement of the rotary detection spot along a Y axis of the position photodetector 522). As indicated in FIG. 3, the optical path length L is affected by axial motion. However, according to previously outlined principles, the axial or Z position signal is relatively accurate, and thus is usable to correct L to allow Equation 5 to provide a relatively accurate determination of $\Delta X_{STYLUS}$ based on the signal arising from $\Delta X_{PSD}$. More specifically, in various implementations the Z position signal may be utilized in combination with the known trigonometry of the scanning probe to remove axial motion cross coupling components from the X and Y position signals. In addition, known types of calibration to reduce cross coupling errors and/or iterative/interdependent position coordinate determination methods may be used to further improve the accuracy of measured X, Y and Z position or displacement values, if desired.

Figure 6:
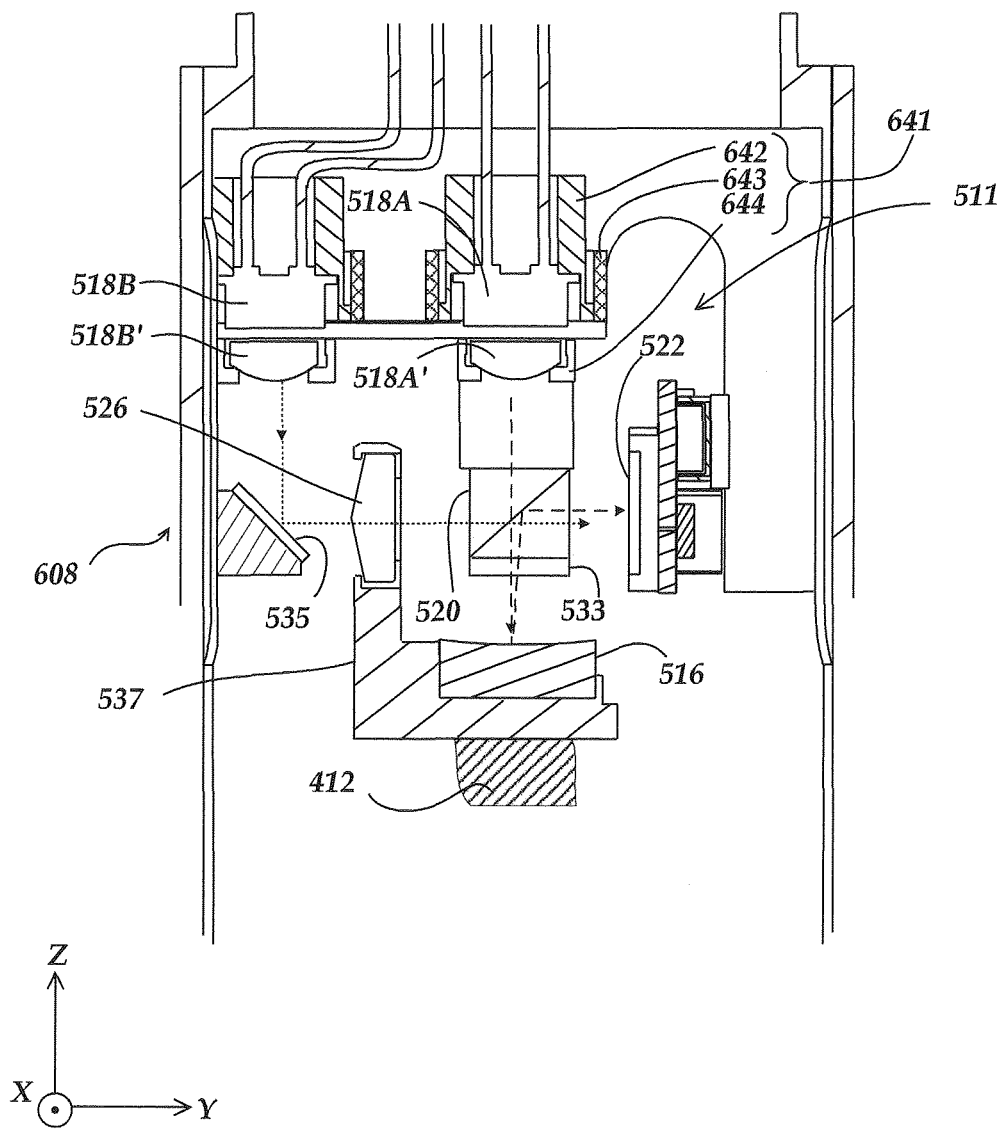
FIG. 6 is a diagram showing the stylus position detection portion of FIG. 5 as coupled within a main body housing of a scanning probe.

FIG. 6 is a diagram showing various portions of the stylus position detection portion 511 of FIG. 5 as coupled to a main body housing 608 of a scanning probe. As outlined above, the axial detection deflector 526 and the rotary detection deflector 516 are both rigidly attached to a bracket 537, which is coupled to the moving member 412 and its attached stylus coupling portion 442 (not shown). Otherwise, various illustrated elements may be fixed (e.g., rigidly attached) directly or indirectly relative to the main body housing 608. In various implementations, the position of the rotary detection spot and the position of the axial detection spot on the position photodetector 522 enable the multiplexing signal processing and control circuitry to determine the corresponding X, Y and Z position signals. The determination of the X, Y and Z position signals enables a determination of the position of the rotary detection deflector 516 and axial detection deflector 526, which correspondingly indicates an absolute 3D position of the moving member 412 (and corresponding stylus coupling portion 442 and attached stylus 406 and contact portion 448, not shown) relative to the main body housing 608.

Alignment of the light sources 518A and 518B may affect the overall performance of the system. In order to allow a proper alignment of the light sources 518A and 518B and/or collimation lenses 518A' and 518B', an alignment assembly such as assembly 641 comprising a Z position tube 642, an XY tube 643, and a holder/baffle 644, may be used in some implementations.

Figure 7:
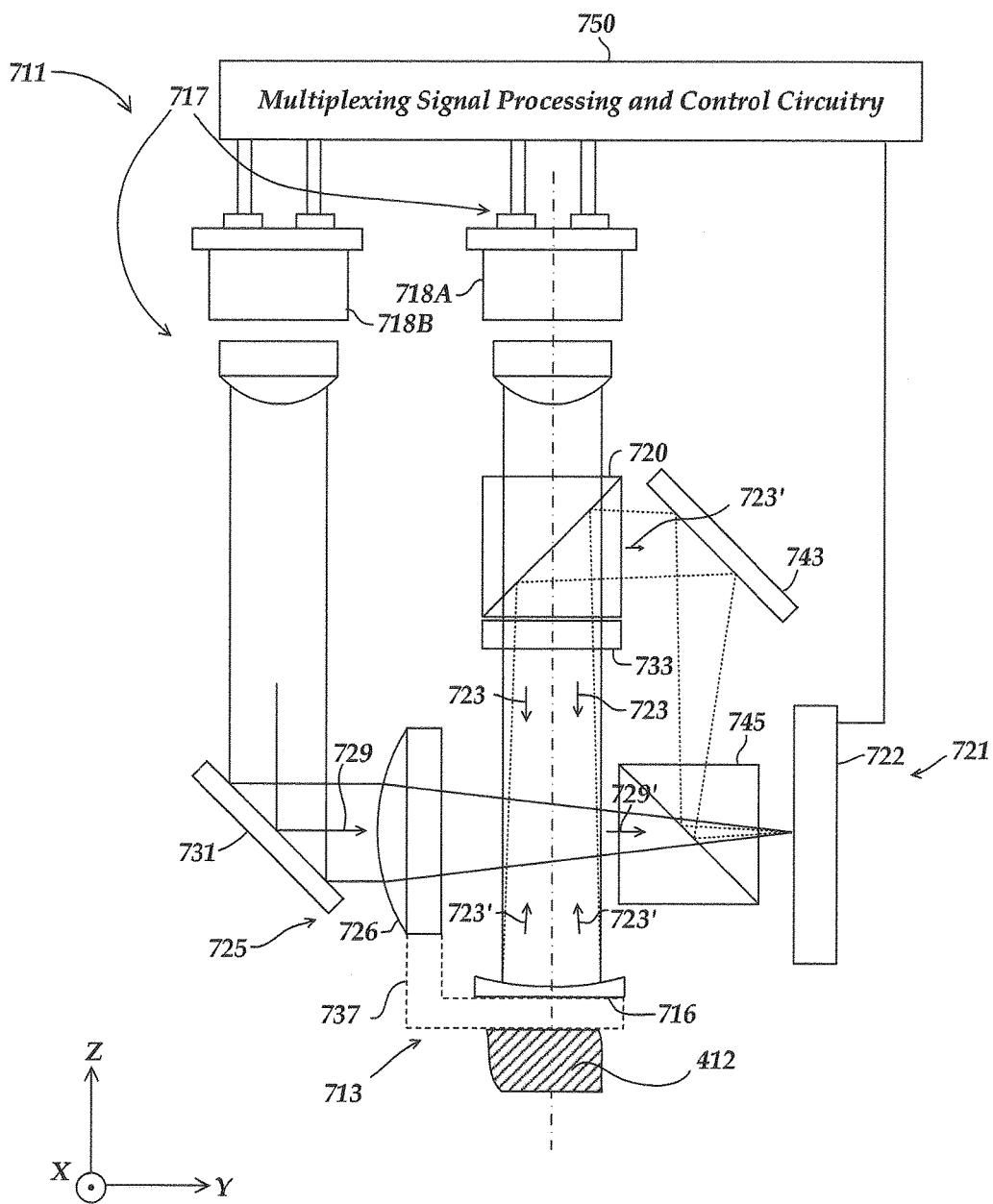
FIG. 7 is a diagram showing a second exemplary implementation of a stylus position detection portion.

FIG. 7 is a diagram showing a second exemplary implementation of a stylus position detection portion 711, which may be understood by analogy with the previous description with respect to FIG. 5. Significant differences from the implementation of FIG. 5 include repositioning the optical component 720 (e.g., a polarizing beamsplitter) and quarter waveplate 733, and adding a mirror 743 and an optical component 745 (e.g., a beamsplitter). Such changes are made in conjunction with using a rotary detection deflector 716 (e.g., a concave mirror) and an axial detection deflector 726 (e.g., a lens) which each have longer focal lengths than the corresponding rotary detection deflector 516 and axial detection deflector 526 of FIG. 5. In the illustrated implementation, the percentage increase in the focal length of the rotary detection deflector 716 is greater than the percentage increase in the focal length of the axial detection deflector 726. Such an implementation may allow more freedom for achieving a desired motion range and/or focus sensitivity for the rotary detection spot provided by the rotary detection deflector 716, and/or for adjusting the relationship between the motion of the rotary detection spot as compared to the motion of the axial detection spot on the position photodetector 722 for corresponding motions of the moving member 412. In addition, such an implementation may allow various other elements to be altered to be more compactly arranged, more efficient, more economical, or the like.

Figure 8:
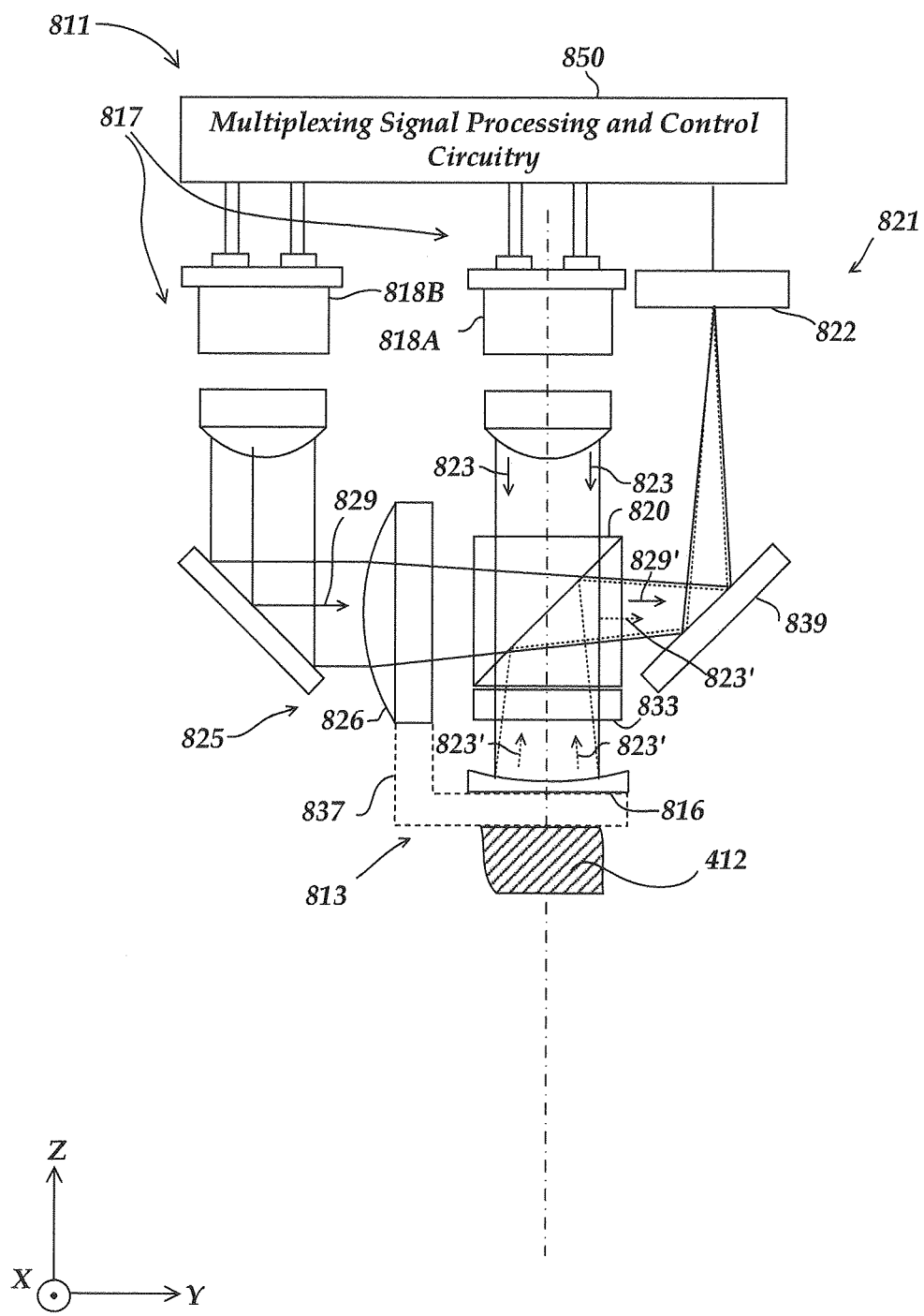
FIG. 8 is a diagram showing a third exemplary implementation of a stylus position detection portion.

FIG. 8 is a diagram showing a third exemplary implementation of a stylus position detection portion 811, which may be understood by analogy with the previous description with respect to FIG. 5. Significant differences from the implementation of FIG. 5 include relocating the position photodetector 822 and adding a mirror 839. Such changes are made in conjunction with using a rotary detection deflector 816 and an axial detection deflector 826 which each have longer focal lengths than the corresponding rotary detection deflector 516 and axial detection deflector 526 of FIG. 5. The implementation illustrated in FIG. 8 may thus correspondingly allow more freedom for achieving a desired motion range and/or focus sensitivity for the rotary detection spot and/or axial detection spot provided by the rotary detection deflector 816 and the axial detection deflector 826, respectively. It will be appreciated that in such a configuration, the position photodetector 821 may be located proximate to the light sources 818A and 818B, such as may be attached to a common circuit board or otherwise connected in close proximity to the multiplexing signal processing and control circuitry (e.g., near a top of a probe). In addition, such implementations may allow various other elements to be altered to be more compactly arranged, more efficient, more economical, or the like.

It should be appreciated that the variations shown in FIGS. 5-8 are indicative of the possibility of further rearranging and/or adjusting various optical elements and related optical paths while retaining many or all of the advantages outlined in association with the principles disclosed herein. For example, as previously indicated, an axial detection deflector may comprise at least one of two crossed cylindrical lenses having focal lengths that are focused onto the Z position photodetector (e.g., the position photodetector 522). In one implementation, one of the cylindrical lenses is mounted to move depending on the stylus deflection (e.g., mounted on the bracket 537) and aligned so its focusing power is in the Y-Z plane. The other cylindrical lens may be fixed (e.g., to the directing portion 535 or its mount) in the axial detection beam path 529 with its focusing power in the X-Y plane. In contrast to a simple circular lens, for such a configuration the motion arc of the axial detection deflector produced by a $\theta_Y$ rotation of the stylus ideally produces no significant undesirable and/or unsensed X axis position change component of the spot on the Z position photodetector, and may reduce and/or simplify the correction of any minor undesirable Z axis position change component of the Z position spot on the position photodetector 522 due to the motion arc. As another example, the rotary detection deflector and/or axial detection deflector may have longer or shorter focal lengths, and/or the corresponding optical paths to the position photodetector may be longer or shorter. In certain implementations, the configuration of the bracket to which the axial detection deflector and the rotary detection deflector are attached may be altered. For example, the relative length of the axial arm to which the axial detection deflector is attached may be increased or decreased, for which it will be appreciated that such alterations may correspondingly alter the amount of movement of the axial detection deflector in response to rotary motion. In other implementations, optical paths may be configured such that the axial detection deflector may be a reflective element (e.g., a concave reflective element) rather than a transmissive element (e.g., a lens). Furthermore, in various implementations, it may be desirable to use polarized light sources oriented to avoid wasting light energy and/or signal strength at various polarizer interfaces along the optical paths. Thus, it will be understood that the various implementations disclosed herein are exemplary only, and not limiting.

Figure 9:
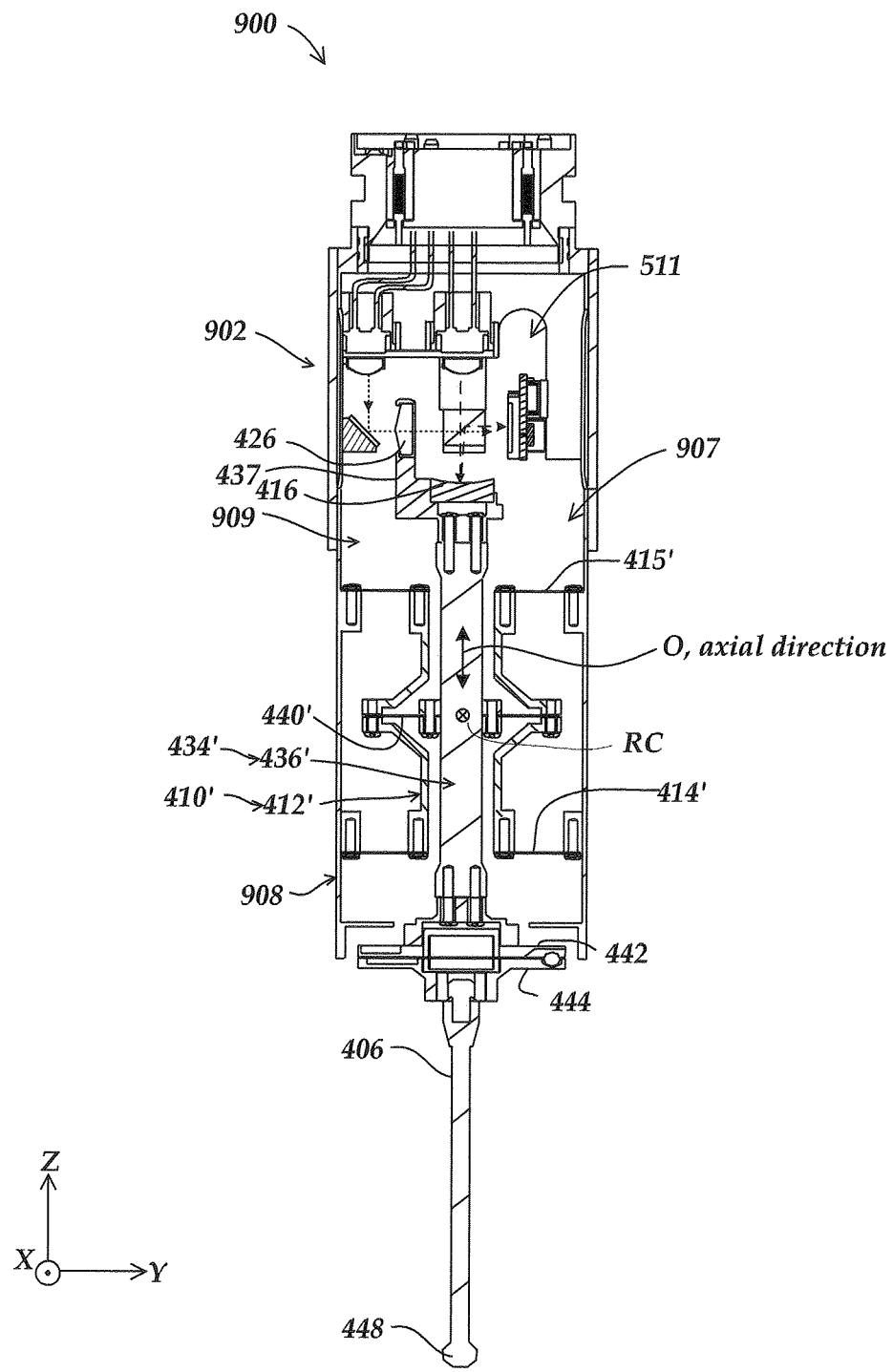
FIG. 9 is a diagram showing a cross section of a second exemplary implementation of a stylus suspension portion as included in a scanning probe.
Figure 10:
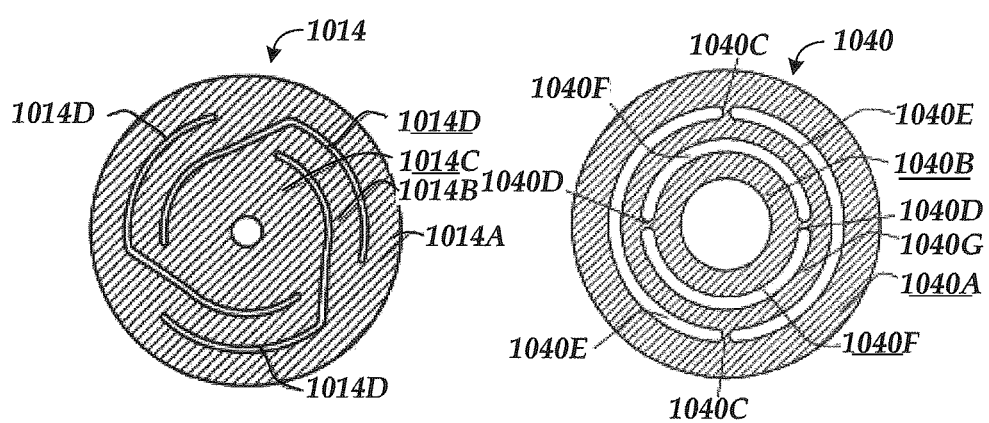
FIGS. 10A and 10B are diagrams showing implementations of flexure elements such as may be utilized in a stylus suspension portion for enabling axial and rotary motion.

FIG. 9 is a partially schematic diagram showing a cross section of a second implementation of a stylus suspension portion 907 usable as the stylus suspension portion 407 represented in FIG. 3, as included within a main body housing 908 of a probe main body 902 of a scanning probe 900. The scanning probe 900 may be similar to the scanning probe 400 previously described with reference to FIG. 4, except the second implementation of the stylus suspension portion 907 is different than the implementation of the stylus suspension portion 407'. Briefly, as previously described with reference to FIG. 4, in the stylus suspension portion 407' an axial motion mechanism 410 including the (axially) moving member 412 is nested or supported inside of the rotating member 436. In contrast, in the present implementation of the stylus suspension portion 907 a rotating member 436' is nested or supported inside an axial motion mechanism 410' including the (axially) moving member 412'.

As shown in FIG. 9, the stylus suspension portion 907 includes a stylus motion mechanism 909 and a stylus coupling portion 442 which is coupled to a stylus 406. The stylus motion mechanism 909 includes a moving member 412', disc-like flexure elements 414' and 415' (i.e., referenced as first flexure elements) supporting the moving member 412' and coupling it to the main body housing 908 for enabling axial motion of the moving member 412' and the elements supported inside it. Elements supported inside the moving member 412' include the rotary motion mechanism 434', comprising the rotating member 436' and a disc-like flexure element 440' (referenced as a second flexure element) coupled the moving member 412' for supporting and enabling rotary motion of the rotating member 436'. The scanning probe 900 includes a stylus position detection portion 511 having components and operation described previously with reference to FIG. 5, for determining the position and/or motion of the stylus motion mechanism 909 and/or the contact portion 448 of the stylus 406.

The second flexure element 440' may be disposed between the respective planes of the pair of first flexure elements 414' and 415' in the axial direction O. The rotating member 436' may have a shape symmetric about the second flexure element 440'. The first flexure elements 414' and 415' may be disposed at a symmetric distance with respect to the second flexure element 440', although such an implementation is exemplary only and not limiting.

A rotary motion mechanism 434', including the rotating member 436', is supported inside of the (axially) moving member 412', and the moving member 412' and the rotary motion mechanism 434' together constitute a motion module that is part of the stylus motion mechanism 909. The axial motion mechanism 410' allows the contact portion 448 of the stylus 406 to move in the axial direction O. The rotary motion mechanism 434', including the rotating member 436', allows the contact portion 448 to move transverse (e.g., approximately perpendicular) to the axial direction O by means of rotary motion about the rotation center RC.

The rotating member 436' integrally includes: a lower portion; a central rod portion connected to the second flexure element 440'; and an upper portion. A stylus coupling portion 442 (e.g., a flange member) is attached to the lower portion of the rotating member 436'. A flange part 444 is provided for attachment of the stylus 406. The flange part 444 and the stylus coupling portion 442 together may constitute a detachable coupling mechanism (e.g., a known type of kinematic joint or coupling) which allows attachment and detachment between various styli 406 and the stylus coupling portion 442 with repeatable positioning (e.g., in the case of a collision knocking off a stylus, when intentionally changing styli, etc.).

A bracket 437 is utilized for rigidly attaching the rotary detection deflector 416 (e.g., a curved mirror) and an axial detection deflector 426 (e.g., a lens) to the upper portion of the rotating member 436'. As previously described with respect to the stylus position detection portion 511 shown in FIG. 5, the rotary detection deflector 416 is included as part of a rotary position detection configuration, and the axial detection deflector 426 is included as part of an axial position detection configuration.

The stylus position detection portion 511, and other stylus position detection portions according to the principles disclosed herein, have particular advantages when used in conjunction with the types of stylus suspension systems outlined herein. However, based on the foregoing it should be appreciated that the stylus position detection portions according to the principles disclosed herein are not limited to use with such suspensions. More generally, provided that the position detection deflectors (e.g., the rotary and/or axial detection deflectors) can be rigidly coupled to a stylus in an operational manner, any compatible type of stylus suspension system may be used, which may include some entirely rotary or entirely rectilinear suspension systems, if desired.

FIGS. 10A and 10B are diagrams showing some specific example implementations of elastically-deformable disk-like flexure elements 1014 and 1040, such as may be utilized in a stylus suspension portion for enabling axial and rotary motion. An example of a material for the flexure elements is phosphor bronze, although it will be appreciated that in other implementations other materials may be utilized. In one implementation, the first flexure element 1014 may be identical with a paired first flexure element (e.g., similar to the flexure elements 414 and 415), while in other implementations a pair of first flexure elements may be different from each other.

The first flexure element 1014 is provided with three cutout portions 1014D that are offset from one another by 120 degrees in the circumferential direction, to form a peripheral portion 1014A, a joining portion 1014B, and a central portion 1014C. The peripheral portion 1014A is an outermost peripheral portion to be fixed to a corresponding element (e.g., a ring portion of the rotating member 436). Opposite ends of the joining portion 1014B are coupled to the peripheral portion 1014A and the central portion 1014C, respectively. The central portion 1014C is a portion to be fixed to a corresponding element (e.g., moving member 412). Displacement of an attached element (e.g., moving member 412) in an axial (or Z) direction causes the central portion 1014C to move normal to the plane of the flexure element 1014 (e.g., the axial direction). It will be appreciated that in other implementations other shapes may be utilized for the flexure elements.

In the implementation of FIG. 10B, the second flexure element 1040 is provided with two arc-shaped cutout portions 1040E offset from each other by 180 degrees in the circumferential direction, and two hinge portions 1040C are formed therebetween. Two arc-shaped cutout portions 1040F offset from each other by 180 degrees in the circumferential direction are further provided on a radially inner side of the cutout portions 1040E and two hinge portions 1040D are formed therebetween. Thereby, a peripheral portion 1040A, a joining portion 1040G, and a central portion 1040B are formed. The peripheral portion 1040A is a portion to be fixed to a respective element (e.g., the main body housing 408). The central portion 1040B is a portion to be fixed to a respective element (e.g., the middle of the cylindrical portion 436C of the rotating member 436). The cutout portions 1040E and 1040F and the resulting hinges are offset from each other by 90 degrees. Thus, the central portion 1040B is tiltable (rotatable) about these hinges with the center of the second flexure element 1040 used as a rotation center RC. It will be appreciated that in other implementations other shapes may be utilized for each of the flexure elements.

Figure 11:
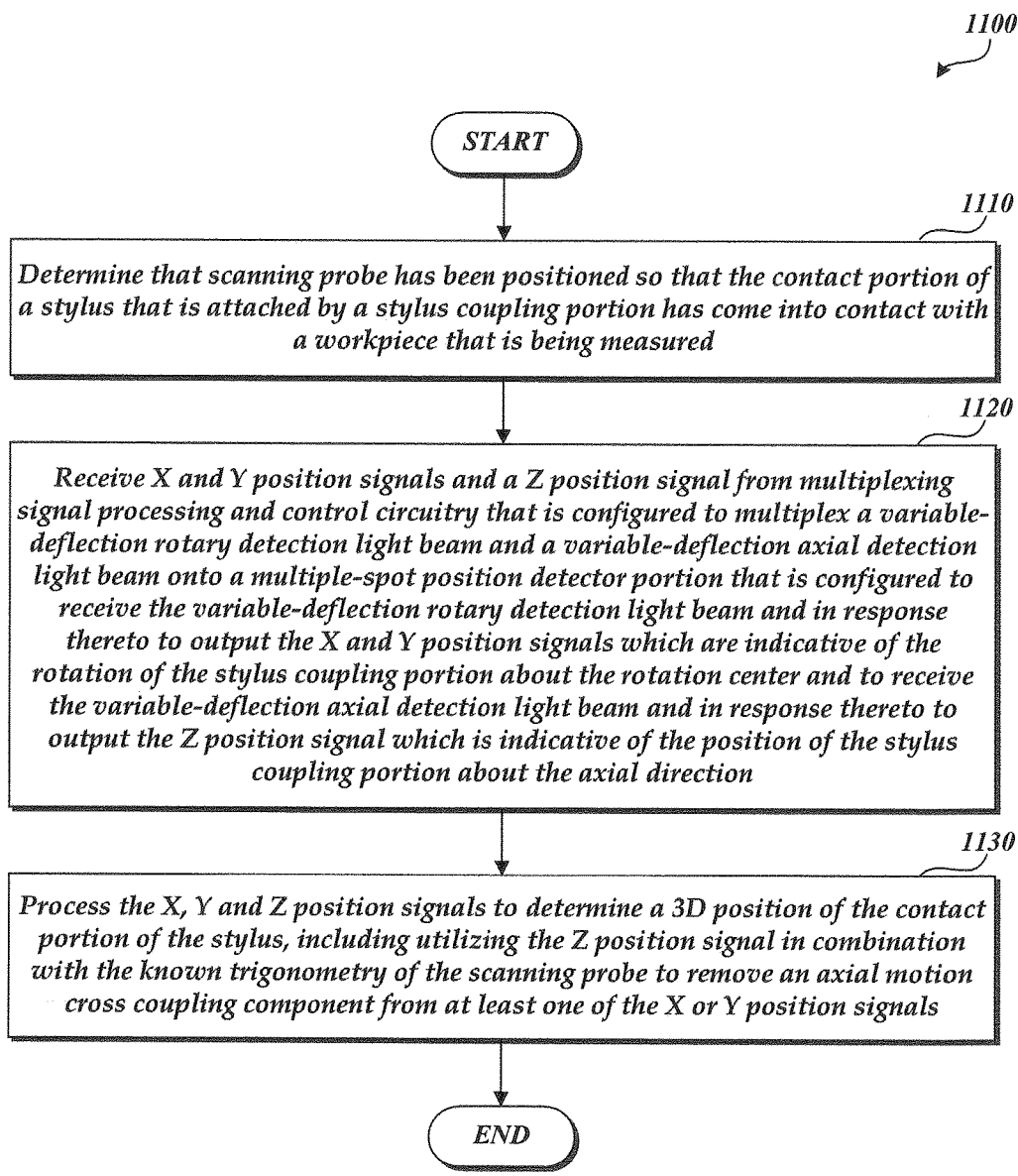
FIG. 11 is a flow diagram illustrating one exemplary implementation of a routine for determining a 3D position of a contact portion of a stylus based on position signals received from a scanning probe.

FIG. 11 is a flow diagram illustrating one exemplary implementation of a routine 1100 for determining a 3D position of a contact portion of a stylus based on position signals received from a scanning probe. At a block 1110, a determination is made that the scanning probe has been positioned so that the contact portion of a stylus that is attached by a stylus coupling portion has come into contact with a surface of a workpiece that is being measured. At a block 1120, X and Y position signals and a Z position signal are received from multiplexing signal processing and control circuitry that is configured to multiplex a variable-deflection rotary detection light beam and a variable-deflection axial detection light beam onto a multiple-spot position detector portion of the scanning probe.

The multiple-spot position detector portion is configured to receive the variable-deflection rotary detection light beam and in response thereto to output the X and Y position signals which are indicative of the rotation of the stylus coupling portion about the rotation center. The multiple-spot position detector portion is also configured to receive the variable-deflection axial detection light beam and in response thereto to output the Z position signal which is indicative of the position of the stylus coupling portion about the axial direction. In various implementations, the multiplexing signal processing and control circuitry includes a demultiplexer that is configured to receive the output from the multiple-spot position detector portion and to separate the X and Y position signals from the Z position signal. At a block 1130, the X, Y and Z position signals are processed to determine a 3D position of the contact portion of the stylus, including utilizing the Z position signal in combination with the known trigonometry of the scanning probe to remove an axial motion cross coupling component from at least one of the X or Y position signals.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A scanning probe for use with a coordinate measuring machine, the scanning probe comprising:
   a stylus suspension portion, comprising:
      a stylus coupling portion that is configured to be rigidly coupled to a stylus; and a stylus motion mechanism that is configured to enable axial motion of the stylus coupling portion along an axial direction, and rotary motion of the stylus coupling portion about a rotation center; and a stylus position detection portion, comprising:
a light source configuration comprising a controllable rotary detection light source that is configured to provide a rotary detection beam and a controllable axial detection light source that is configured to provide an axial detection beam;
a multiple-spot position detector portion;
multiplexing signal processing and control circuitry;
a rotary position detection configuration, comprising:
a rotary position detection beam path configured to receive the rotary detection beam from the controllable rotary detection light source; and
a rotary detection deflector that is located along the rotary position detection beam path and that is coupled to the stylus suspension portion and that is configured to output a variable-deflection rotary detection light beam to the multiple-spot position detector portion; and
an axial position detection configuration, comprising:
an axial detection beam path configured to receive the axial detection beam from the controllable axial detection light source; and
an axial detection deflector that is located along the axial detection beam path and that is coupled to the stylus suspension portion and that is configured to output a variable-deflection axial detection light beam to the multiple-spot position detector portion, wherein the axial detection deflector is configured to move in the axial direction in response to the axial motion, wherein the axial detection deflector is also configured to move in at least one direction transverse to the axial direction in response to the rotary motion;
wherein:
the multiple-spot position detector portion is configured to receive the variable-deflection rotary detection light beam and in response thereto to output X and Y position signals indicative of rotation of the stylus coupling portion about the rotation center, and is also configured to receive the variable-deflection axial detection light beam and in response thereto to output a Z position signal indicative of a position of the stylus coupling portion about the axial direction;
the multiplexing signal processing and control circuitry is configured to multiplex the variable-deflection rotary detection light beam and the variable-deflection axial detection light beam onto the multiple-spot position detector portion, and to provide demultiplexing to separate the X and Y position signals from the Z position signal; and
the stylus position detection portion is configured such that the Z position signal is substantially insensitive to motion of the axial detection deflector in the at least one direction that is transverse to the axial direction.

2. The scanning probe of claim 1, wherein the multiple-spot position detector portion comprises a position photodetector that outputs the Z position signal responsive to a position along a Z detection axis of the position photodetector of an axial detection spot or line formed by the variable-deflection axial detection light beam.

3. The scanning probe of claim 2, wherein the variable-deflection axial detection light beam is at least partially focused by the axial detection deflector to form the axial detection spot or line on the position photodetector, and motion of the axial detection deflector along a first direction transverse to the axial direction alters the axial detection spot or line without substantially altering an effective position of the axial detection spot or line on the position photodetector.

4. The scanning probe of claim 3, wherein the axial detection deflector comprises a lens.

5. The scanning probe of claim 3, wherein the axial position detection configuration is further configured such that:
the variable-deflection axial detection light beam is at least partially focused by the axial detection deflector to form the axial detection spot on the position photodetector;
the Z position signal is responsive to a position of the axial detection spot along the Z detection axis of the position photodetector; and
motion of the axial detection deflector along a second direction transverse to the axial direction alters a position of the axial detection spot formed on the position photodetector along a direction that is orthogonal to the Z detection axis of the position photodetector.

6. The scanning probe of claim 1, wherein the axial detection deflector and the rotary detection deflector are rigidly coupled to one another.

7. The scanning probe of claim 1, wherein the axial detection deflector and the rotary detection deflector are rigidly coupled to the stylus coupling portion.

8. canning probe of claim 1, wherein the scanning probe further comprises a housing, and the light source configuration and the multiple-spot position detector portion are rigidly coupled to the housing.

9. The scanning probe of claim 8, wherein the X and Y position signals in combination with the Z position signal enables determination of an absolute 3D position of the stylus coupling portion relative to the housing.

10. The scanning probe of claim 1, wherein the multiple-spot position detector portion comprises a position photodetector that is configured to output the X position signal responsive to a position along a first axis of the position photodetector of a rotary detection spot formed by the variable-deflection rotary detection light beam, and that is configured to output the Y position signal responsive to a position along a second axis of the position photodetector of the rotary detection spot.

11. The scanning probe of claim 10, wherein:
the rotary detection deflector is coupled to the stylus suspension portion to move in response to the rotary motion, and the axial detection deflector also moves in the axial direction in response to the axial motion; and
the rotary position detection configuration is nominally configured such that when there is no rotation of the stylus coupling portion about the rotation center the X and Y position signals are substantially insensitive to motion of the rotary detection deflector along the axial direction.

12. The scanning probe of claim 10, wherein the rotary position detection configuration is configured such that the variable-deflection rotary detection light beam is at least partially focused by the rotary detection deflector to form the rotary detection spot on the position photodetector.

13. The scanning probe of claim 12, wherein the rotary detection deflector comprises a concave mirror.

14. The scanning probe of claim 1, wherein:
the rotary detection deflector comprises a concave mirror having an optical axis oriented along the axial direction, and is located along a portion of the rotary position detection beam path that extends along the axial direction, and the rotary motion moves the rotary detection deflector transverse to its optical axis; and the axial detection deflector comprises a lens having an optical axis oriented transverse to the axial direction, and is located along a portion of the axial detection beam path that extends along a transverse direction, and the axial motion moves the axial detection deflector transverse to its optical axis.

15. The scanning probe of claim 14, wherein:
the multiple-spot position detector portion comprises a position photodetector having a surface plane;
the rotary position detection configuration further comprises a reflective surface that is configured to reflect the variable-deflection rotary detection light beam along a direction transverse to the optical axis to a position on the surface plane of the position photodetector; and
the variable-deflection axial detection light beam is transmitted from the axial detection deflector to a position on the surface plane of the position photodetector.

16. The scanning probe of claim 15, wherein the rotary position detection configuration further comprises a quarter waveplate located along a portion of the rotary position detection beam path that extends between the reflective surface and the rotary detection deflector.

17. The scanning probe of claim 14, wherein the stylus position detection portion further comprises a reflective surface that is configured to reflect both the variable-deflection rotary detection light beam and the variable-deflection axial detection light beam to respective positions on the surface plane of the position photodetector.

18. The scanning probe of claim 1, wherein the multiplexing signal processing and control circuitry comprises:
a rotary detection function generator that is coupled to the controllable rotary detection light source;
an axial detection function generator that is coupled to the controllable axial detection light source; and
a demultiplexer that is coupled to the multiple-spot position detector portion;
wherein the multiplexing signal processing and control circuitry is configured to control the rotary detection function generator and the axial detection function generator so as to multiplex the variable-deflection rotary detection light beam and the variable-deflection axial detection light beam onto the multiple-spot position detector portion, and is also configured to control the demultiplexer to separate the X and Y position signals from the Z position signal.

19. The scanning probe of claim 1, wherein the multiplexing signal processing and control circuitry utilizes frequency domain multiplexing to multiplex the variable-deflection rotary detection light beam and the variable-deflection axial detection light beam onto the multiple-spot position detector portion.

20. The scanning probe of claim 1, wherein the multiplexing signal processing and control circuitry utilizes time domain multiplexing to multiplex the variable-deflection rotary detection light beam and the variable-deflection axial detection light beam onto the multiple-spot position detector portion.

21. A method for determining a 3D position of a contact portion of a stylus based on position signals received from a scanning probe that the stylus is attached to, the method comprising:

determining that the scanning probe has been positioned so that the contact portion of the attached stylus has come into contact with a workpiece that is being measured, wherein the scanning probe comprises:
a stylus suspension portion, comprising:
a stylus coupling portion that is configured to be rigidly coupled to the stylus; and
a stylus motion mechanism that is configured to enable axial motion of the stylus coupling portion along an axial direction, and rotary motion of the stylus coupling portion about a rotation center; and
a stylus position detection portion, comprising:
a light source configuration comprising a controllable rotary detection light source that is configured to provide a rotary detection beam and a controllable axial detection light source that is configured to provide an axial detection beam;
a multiple-spot position detector portion;
multiplexing signal processing and control circuitry;
a rotary position detection configuration, comprising:
a rotary position detection beam path configured to receive the rotary detection beam from the controllable rotary detection light source; and
a rotary detection deflector that is located along the rotary position detection beam path and that is coupled to the stylus suspension portion and that is configured to output a variable-deflection rotary detection light beam to the multiple-spot position detector portion; and
an axial position detection configuration, comprising:
an axial position detection beam path configured to receive the axial detection beam from the controllable axial detection light source; and
an axial detection deflector that is located along the axial detection beam path and that is coupled to the stylus suspension portion and that is configured to output a variable-deflection axial detection light beam to the multiple-spot position detector portion, wherein the axial detection deflector is configured to move in the axial direction in response to the axial motion, wherein the axial detection deflector is also configured to move in at least one direction transverse to the axial direction in response to the rotary motion;
wherein:
the multiple-spot position detector portion is configured to receive the variable-deflection rotary detection light beam and in response thereto to output X and Y position signals indicative of a rotation of the stylus coupling portion about the rotation center, and is also configured to receive the variable-deflection axial detection light beam and in response thereto to output a Z position signal indicative of a position of the stylus coupling portion about the axial direction;
the multiplexing signal processing and control circuitry is configured to multiplex the variable-deflection rotary detection light beam and the variable-deflection axial detection light beam onto the multiple-spot position detector portion, and to provide demultiplexing to separate the X and Y position signals from the Z position signal; and
the stylus position detection portion is configured such that the Z position signal is substantially insensitive to motion of the axial detection deflector in the at least one direction that is transverse to the axial direction; and receiving the X, Y and Z position signals from the multiplexing signal processing and control circuitry; and processing the X, Y and Z position signals to determine a 3D position of the contact portion of the stylus.

22. The method of claim 21, wherein the processing of the X, Y and Z position signals includes utilizing the Z position signal in combination with a known trigonometry of the scanning probe to remove an axial motion cross coupling component from at least one of the X or Y position signals.

23. A system for determining a 3D position of a contact portion of a stylus based on position signals received from a scanning probe that the stylus is coupled to, the system comprising:

a receiving portion for receiving X and Y position signals and a Z position signal from the scanning probe, wherein the scanning probe comprises:

a stylus suspension portion, comprising:
a stylus coupling portion that is configured to be rigidly coupled to the stylus; and
a stylus motion mechanism that is configured to enable axial motion of the stylus coupling portion along an axial direction, and rotary motion of the stylus coupling portion about a rotation center; and a stylus position detection portion, comprising:
a light source configuration comprising a controllable rotary detection light source that is configured to provide a rotary detection beam and a controllable axial detection light source that is configured to provide an axial detection beam;
a multiple-spot position detector portion;
multiplexing signal processing and control circuitry;
a rotary position detection configuration, comprising:
a rotary position detection beam path configured to receive the rotary detection beam from the controllable rotary detection light source; and
a rotary detection deflector that is located along the rotary detection beam path and that is coupled to the stylus suspension portion and that is configured to output a variable-deflection rotary detection light beam to the multiple-spot position detector portion; and an axial position detection configuration, comprising:
an axial detection beam path configured to receive the axial detection beam from the axial detection light source; and
an axial detection deflector that is located along the axial detection beam path and that is coupled to the stylus suspension portion and that is configured to output a variable-deflection axial detection light beam to the multiple-spot position detector portion, wherein the axial detection deflector is configured to move in the axial direction in response to the axial motion, wherein the axial detection deflector is also configured to move in at least one direction transverse to the axial direction in response to the rotary motion;

wherein:
the multiple-spot position detector portion is configured to receive the variable-deflection rotary detection light beam and in response thereto to output the X and Y position signals indicative of the rotation of the stylus coupling portion about the rotation center, and is also configured to receive the variable-deflection axial detection light beam and in response thereto to output the Z position signal indicative of the position of the stylus coupling portion about the axial direction;

the multiplexing signal processing and control circuitry is configured to multiplex the variable-deflection rotary detection light beam and the variable-deflection axial detection light beam onto the multiple-spot position detector portion, and to provide demultiplexing to separate the X and Y position signals from the Z position signal; and the stylus position detection portion is configured such that the Z position signal is substantially insensitive to motion of the axial detection deflector in the at least one direction that is transverse to the axial direction; and a processing portion for processing the X, Y and Z position signals to determine a 3D position of the contact portion of the stylus.

* * * * *

UNITED STATES PATENT AND TRADEMARK OFFICE
CERTIFICATE OF CORRECTION

PATENT NO. : 9,791,262 B2
APPLICATION NO. : 14/973376
DATED : October 17, 2017
INVENTOR(S) : Scott Allen Harsila et al.

Page 1 of 1

It is certified that error appears in the above-identified patent and that said Letters Patent is hereby corrected as shown below:

In the Claims

Column 13, Line 24:
"8. canning probe of claim 1, wherein the scanning probe" should read, -- 8. The scanning probe of claim 1, wherein the scanning probe --.

Signed and Sealed this
Twentieth Day of February, 2018

Andrei Iancu
*Director of the United States Patent and Trademark Office*